US012372299B2

(12) United States Patent
Eurlings et al.

(10) Patent No.: US 12,372,299 B2
(45) Date of Patent: Jul. 29, 2025

(54) WASTE DRYING

(71) Applicant: RWE GENERATION NL B.V., Geertruidenberg (NL)

(72) Inventors: Johannes Theodorus Gerardus Marie Eurlings, Obbicht (NL); Carlo Jacobus Johannes Maria DE BEST, Wamel (NL)

(73) Assignee: RWE GENERATION NL B.V., Geertruidenberg (NL)

( * ) Notice: Subject to any disclaimer, the term of this patent is extended or adjusted under 35 U.S.C. 154(b) by 0 days.

(21) Appl. No.: 18/558,979

(22) PCT Filed: Jun. 21, 2022

(86) PCT No.: PCT/EP2022/066889
§ 371 (c)(1),
(2) Date: Nov. 3, 2023

(87) PCT Pub. No.: WO2023/280565
PCT Pub. Date: Jan. 12, 2023

(65) Prior Publication Data
US 2024/0230223 A1 Jul. 11, 2024

(30) Foreign Application Priority Data
Jul. 6, 2021 (EP) .................................... 21183993

(51) Int. Cl.
*F26B 3/06* (2006.01)
*F26B 17/26* (2006.01)
(Continued)

(52) U.S. Cl.
CPC ................ *F26B 3/06* (2013.01); *F26B 17/26* (2013.01); *F26B 21/10* (2013.01); *F26B 21/12* (2013.01);
(Continued)

(58) Field of Classification Search
CPC .. F26B 3/06; F26B 17/26; F26B 21/10; F26B 21/12; F26B 25/007; F26B 2200/04;
(Continued)

(56) References Cited

U.S. PATENT DOCUMENTS 2,214,981 A 9/1940 Vissac
2,230,833 A * 2/1941 Douglass .............. F27B 7/2016 432/5
(Continued)

FOREIGN PATENT DOCUMENTS

CN 112013403 12/2020
DE 2146615 7/1975
(Continued)

OTHER PUBLICATIONS

International Application No. PCT/EP2022/066889—Patent Cooperation Treaty International Search Report—Completed Sep. 19, 2022 (Mailed Sep. 28, 2022).
(Continued)

*Primary Examiner* — Edelmira Bosques
*Assistant Examiner* — Bao D Nguyen
(74) *Attorney, Agent, or Firm* — Lott & Fischer, PL

(57) ABSTRACT

According to the present invention waste 7 is dried by applying the waste 7 to a floor 4 comprising several floor segments 34, 44, 46 and by conveying the waste 7 by a push floor mechanism in which only a part of the floor segments 34, 44, 46 is moved at a time in a direction of movement 8 or a counter direction 61. The energy for drying the waste 7 is provided by warm air 11 through openings 38 in the floor segments 34, 44, 46 from a pressure chamber 3 through the floor 4 into the waste 7 and through the waste 7.

15 Claims, 4 Drawing Sheets

Figure 1:
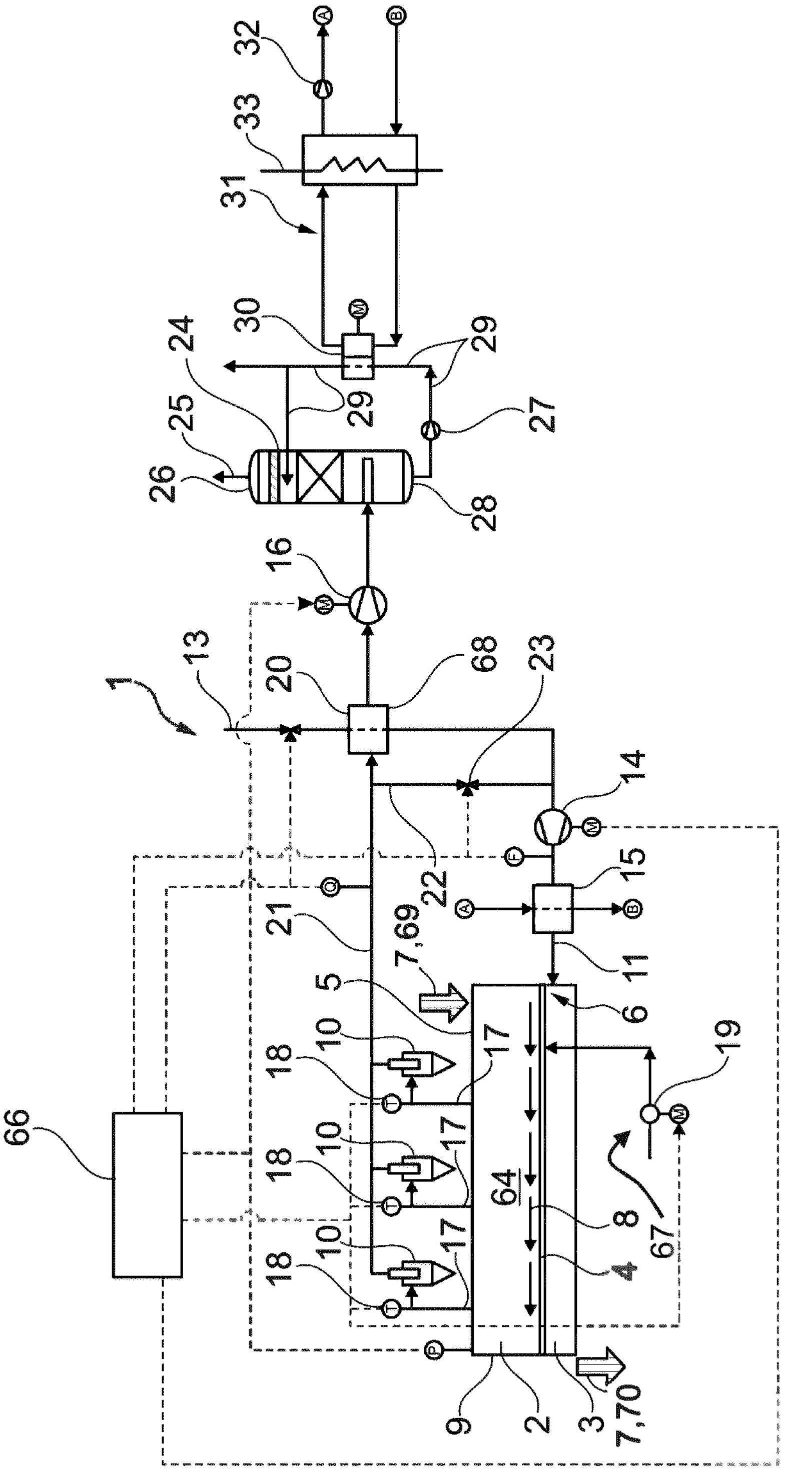

(51) Int. Cl.

| | |
|---|---|
| ***F26B 21/10*** | (2006.01) |
| ***F26B 21/12*** | (2006.01) |
| *F26B 25/00* | (2006.01) |

(52) U.S. Cl.

CPC ......... *F26B 25/007* (2013.01); *F26B 2200/04* (2013.01); *F26B 2200/18* (2013.01)

(58) Field of Classification Search

CPC ...... F26B 2200/18; F23H 11/00; F23H 11/06; F23H 11/08; F23H 11/10

See application file for complete search history.

(56) References Cited

U.S. PATENT DOCUMENTS

| | | | | |
|---|---|---|---|---|
| 4,132,007 | A * | 1/1979 | Voorheis | F26B 23/022 34/514 |
| 4,288,295 | A * | 9/1981 | Marsden | C10B 57/06 201/1 |
| 4,603,489 | A * | 8/1986 | Goldberg | D06F 58/206 34/605 |
| 5,527,458 | A * | 6/1996 | Gehrmann | F26B 17/045 34/68 |
| 5,839,207 | A * | 11/1998 | Christensen | B01J 8/44 34/583 |
| 8,881,424 | B2 | 11/2014 | Lenoir et al. | |
| 2011/0173836 | A1 * | 7/2011 | Orr | F26B 3/084 34/474 |

FOREIGN PATENT DOCUMENTS

| | | |
|---|---|---|
| EP | 2587203 | 9/2015 |
| EP | 3992268 | 5/2022 |
| JP | H04335987 | 11/1992 |
| KR | 2010080001 | 7/2010 |
| RU | 2679336 | 2/2019 |
| WO | 9734679 | 9/1997 |

OTHER PUBLICATIONS

International Application No. PCT/EP2022/066889—Patent Cooperation Treaty PCT Written Opinion of the International Searching Authority—Completed Sep. 19, 2022 (Mailed Sep. 28, 2022).

* cited by examiner

WASTE DRYING

This application is a national phase of PCT Application No. PCT/EP2022/066889 filed Jun. 21, 2022, the contents of which are hereby incorporated by reference.

Waste and in particular household waste or municipal solid waste (MSW) is generated constantly and needs to be taken care of. This waste can be landfilled but can be used otherwise, such as by burning creating steam and, subsequently, electric energy, by being used as additional fuel in power plants or by being used chemically as is disclosed e.g. in the European patent application with application no. EP20204801.3. If not landfilling waste in general the inhomogeneous composition in particular of MSW causes problems that result e.g. in a rather high humidity of the waste that complicates both the burning of the waste and a chemical use of the waste. Same holds for biomass, such as wooden remains, remains of plants, sludge, manure, etc. To reduce these problems dryers are known to dry the waste or the biomass. These are frequently belt dryers, as known e.g. from WO 2010/080001 A2. This system is electrically heated by Ohmic heating and needs a large amount of electrical energy to provide the necessary heat to dry the waste. EP 2 587 203 A1 discloses another example of a belt dryer which comprises sections that are flown through by drying air separately. This dryer is complicated regarding its construction and the control of the drying air.

Based on this the object of the present invention is to overcome the drawbacks known from prior art. This object is solved by the features of the independent claims. The respective dependent claims are directed to advantageous embodiments of the invention. Further embodiments can be deducted from the specification including the figures and the respective description of the figures.

The method for drying waste according to the present invention comprises the steps of

- applying waste into a waste chamber on an inlet end of a floor which comprises at least two floor segments,
- providing warm air of a temperature of more than 70° C., preferably between 80° C. and 90° C. to a pressure chamber beneath the floor, with a pressure being above the pressure in the waste chamber, so that the warm air is passing through openings in the floor into the waste chamber and through the waste;
- conveying the waste in a direction of movement from the inlet end to an outlet end of the floor by moving individual floor segments into the direction of movement and in a counter direction being opposite the direction of movement for a predetermined amount, respectively; and
- conveying waste having fallen from the outlet end of the floor out of the waste room.

Waste in the context of the document is understood to comprise municipal solid waste, biomass, e.g. wooden remains, remains of plants, sludge and/or manure, and/or industrial waste. The waste in the context of this document is understood as heterogeneous bulk material. The present invention relies on a novel approach to dry waste. In this approach the waste is moved through a waste chamber using a walking floor or push floor approach in which the floor dividing the waste chamber from the pressure chamber is partitioned in at least two floor segments, arranged in a plane to form the floor. Preferably, each floor segments spans the whole length of the floor in the direction of movement, in particular from the inlet end to the outlet end. This facilitates the transport of the waste through the waste chamber.

Preferably, in the pressure chamber the pressure is between 5 and 10 mbar [millibar] higher than in the waste chamber.

A push floor or walking floor movement is generated by only a part of the floor segments performing a movement at a given time. Thus, at least one floor segment or a group of floor segments but not all floor segments perform a movement into the direction of movement or in the counter direction. This is the only movement, which is performed by the floor segments, in particular, the moving floor segments are not raised or lowered during the process but stay in the mentioned plane. Each floor segment can, thus, perform an individual movement by a predetermined amount, i.e. a stepwise movement into the direction of movement and the counter direction. This amount or step is defined by the layout of the floor and the floor segments as well as by the layout of a drive mechanism to move the floor segment, e.g. a hydraulic movement system.

In a first preferred example of such a movement as a first step all floor segments together are moved into the direction of movement. In a second and following steps a first individual floors segment or a first group of floor segments is moved into the counter direction of the direction of movement. Thereafter, other floor segments are moved into the counter direction in groups or individually until all floor segments are in the starting position. Thereafter, the whole floor moves according to the first step and so forth.

In a second preferred example of such a movement a first individual floor segment or a first group of floor segments is moved into the direction of movement and, thereafter, into the counter direction. Thereafter a second floor segment or a second group of floor segments is moved into the direction of movement and, thereafter, into the counter direction. Thereafter further floor segments or groups of floor segments can be moved analogously until all floor segments have been moved accordingly. Thereafter, the cycle can start again.

In a third preferred example of such a movement a first individual floor segment or a first group of floor segments is moved into the direction of movement. Thereafter a second floor segment or a second group of floor segments is moved into the direction of movement. Thereafter further floor segments or groups of floor segments can be moved analogously into the direction of movement until all floor segments have been moved accordingly. Thereafter, a first individual floor segment or a first group of floor segments is moved into the counter direction. Thereafter a second floor segment or a second group of floor segments is moved into the counter direction. Thereafter further floor segments or groups of floor segments can be moved analogously into the counter direction until all floor segments have been moved accordingly. Thereafter, the cycle can start again.

By the present invention the conveying speed of the waste through the waste chamber is easily controllable and adjustable to the humidity of wet waste applied to the floor on the inlet end and the humidity of the dry waste conveyed after having fallen from the outlet end of the floor.

Simultaneously, the heating process and the provisions for heating and drying the waste are simple. The whole waste chamber, i.e. the whole room in a respective dryer through which waste is conveyed is divided by the floor from a single, preferably undivided pressure room. The whole pressure room is provided with warm air at a pressure which is slightly above the pressure in the waste chamber. This is easily accomplished by using a circulation fan to press the warm air into the pressure chamber. Due to the openings in the floor segments warm air is pressed into the waste chamber. Preferably, to allow an easy control of the process and to avoid the use of sluicing equipment, the pressure in the waste chamber is held at ambient pressure, i.e. the pressure in the surroundings of the waste chamber. This can be realized by sucking the air in the waste chamber, which is denoted as off-gas in the following, with an exhaust air fan out of the waste chamber. Simultaneously, by the use of the exhaust air fan, and, preferably, a subsequent circulation fan, the mass balance of the air in the system is controlled. Simultaneously, problems resulting from uncontrolled air exchange with the surrounding are suppressed easily by this arrangement.

The pressure chamber is closed to the surroundings. The waste chamber is not sealed to the surroundings and is basically open to the surroundings. Air leakage from the waste chamber to the surroundings is minimized by controlling the pressure in the waste chamber at ambient pressure.

The waste comprises preferably at least in part Municipal Solid Waste, industrial waste and/or biomass. The waste is preferably at least in part solid and comprises a multitude of pieces and can be understood as bulk material.

The thermal energy content of the off-gas and the water vapor in it can be used to heat the warm air before entering the pressure chamber. This can be realized by using a heat exchanger and/or a heat pump to increase the temperature of the warm air before entering the pressure chamber. Furthermore, it is preferred to at least in part recirculate the off-gas as at least a part of the warm air to control the humidity of the warm air and to limit the heat loss from the dryer.

Preferably, the floor is creating a floor pressure drop for the air passing the openings, wherein the waste on the floor creates a waste pressure drop for the air passing from the openings through the waste, wherein the amount of waste being applied to the floor is controlled such that a ratio between the floor pressure drop and the waste pressure drop is at least two (2). Preferably, the floor pressure drop amounts to at least 70% of the total pressure drop, the remainder being the waste pressure drop. This results in an evenly distribution of the warm air over the floor and, consequently, an even heating and drying of the waste. The waste is as a bulk material a porous system through which the air flows after having passed the floor.

As the waste comprises a multitude of particles that usually follow a particle size distribution the waste is inhomogeneous resulting in a variation of the pressure drop even if the level (height) of the waste is constant. Nevertheless, the particle size distribution of the waste can be reasonably controlled upstream of the drying e.g. by a grinder and/or a mill. This allows to adjust the waste pressure drop accordingly, preferably by using a shredder with a fixed shredder mesh and the waste height at which the waste is applied to the floor.

Preferably, off-gas is sucked off from the waste chamber above the waste. This allows to adjust the pressure level in the waste chamber. The off-gas which is collected above the waste in the waste chamber has a humidity distribution which usually varies along the direction of movement. The waste itself is applied as wet waste at the inlet end and leaves the waste chamber at the outlet end as dried waste. The humidity of the wet waste is higher than the humidity at the outlet end. Thus, the drying process leads to a significantly higher evaporation close to the inlet end than close to the outlet end. Thus, the respective air having passed the waste, i.e. the off-gas above the waste, will be cooler close to the inlet end than close to the outlet end correlating to the amount of energy being used to bring up the evaporation enthalpy for evaporating the humidity in the waste. Likewise, the off-gas is carrying a higher water load close to the inlet end compared to air closer to the outlet end.

This means the off-gas above the waste displays a temperature profile along the direction of movement which is correlated to the humidity of the waste at the respective position in the direction of movement. This can be measured if off-gas is sucked of at different positions along the direction of movement and measuring the temperature depending on the position along the direction of movement. The respective temperature profile is preferably used to control the drying process, e.g. by controlling a) the temperature of the warm air entering the pressure chamber; b) the volume flow of the warm air entering the pressure chamber and/or c) the movement speed of the waste through the waste chamber. In this the use of the temperature profile to at least control c) the movement speed of the waste through the waste chamber is preferred, as this allows an efficient control of the movement speed and, thus, the humidity of the waste at the outlet end of the floor.

Preferably, the off-gas is provided to at least one cyclone to separate particles in the off-gas from an exhaust air. This allows to reduce the particle load on the off-gas. The remaining exhaust air can be further cleaned, e.g. in a wet scrubber.

Preferably, the off-gas is sucked through at least two cyclones connected in parallel to the waste chamber, each cyclone being arranged at a different position in the direction of movement, whereas the temperature of the off-gas flowing to each cyclone is measured allowing to determine a temperature profile of the off-gas in the direction of movement and using this temperature profile to control at least one of the following variables: a) the temperature of the warm air entering the pressure chamber; b) the volume flow of the warm air entering the pressure chamber; and c) the movement speed of the waste through the waste chamber. The cyclones are used to reduce the particle load in the off-gas. The particles are preferably reintroduced into the waste in the waste chamber, while exhaust air from the cyclones is conveyed of having a reduced dust load.

By the reduction of the dust content in the off-gas a possible leak of harmful materials into the environment can be prevented. Simultaneously, a possible cleaning of the off-gas (or the exhaust air from the cyclones) e.g. by a wet scrubber provided downstream can be performed more easily by reducing the particle load to the wet scrubber. As stated above the temperature profile is an effective measure to control the drying process.

Preferably, the off-gas or the exhaust air is conveyed to a wet scrubbing unit. This allows to further clean the off-gas or the exhaust air and, simultaneously, to transfer thermal energy from the off-gas or the exhaust air to the scrubbing liquid which can itself be used e.g. in a heat pump to transfer the thermal energy via an intermediary medium to the warm air. The heat transfer from the off-gas or the exhaust air in a wet scrubbing unit is in this case highly efficient, as due to the condensation of humidity in the off-gas or exhaust air a large amount of thermal energy is released and transferred to the washing medium which is preferably water. For example, wet scrubbing unit is driven with water of a temperature of 12° C. to 16° C. as a washing medium and the off-gas or exhaust air being humid is having a temperature of about 30° ° C. to 35° ° C. the washing medium can be heated to 25° C. to 30° C. when leaving the wet scrubbing unit. This warm water can be used to drive a heat pump efficiently.

Preferably, the off-gas or the exhaust air is guided through a heat exchanger for preheating fresh air to be delivered to the pressure chamber as warm air. This allows to preheat the fresh air to a temperature level of e.g. to 30° ° C. to 35° C. while cooling the off-gas or exhaust air simultaneously.

Preferably, the warm air is heated before entering the pressure chamber by heat provided from a heat pump in which latent heat of the off-gas or the exhaust air is used as a source of thermal energy. This is preferably performed by using a wet scrubbing unit and using the washing medium as intermediary medium as described above.

Preferably, the level of the waste applied onto the floor is controlled to be at a predetermined level. This allows on the one hand to control the waste pressure drop. On the other hand the control of the level ensures that gaps created in the waste at the inlet end due to the push floor movement as described above are efficiently filled with fresh wet waste. This increase the efficiency of the push floor conveyance of the waste through the waste chamber.

According to another aspect of the present invention, a dryer for drying waste is suggested, comprising

- a waste chamber and a pressure chamber, said waste chamber being separated from the pressure chamber by a floor for carrying the waste, wherein said floor defines a plane in which the floor extends,
- an inlet for applying waste onto an inlet end of the floor and an outlet for removing waste from an outlet end of the floor defining a direction of movement in the plane from the inlet end to the outlet end,
- wherein the floor comprises at least two floor segments, each floor segment being movable independent of at least one other floor segment in the plane in the direction of movement and against the direction of movement,
- wherein the floor segments comprise openings connecting the pressure chamber with the waste chamber,
- wherein the pressure chamber is providable with air at a pressure being higher than the pressure in the waste chamber. Preferably, in the pressure chamber the pressure is between 5 and 10 mbar [millibar] higher than in the waste chamber.

Preferably, the dryer can be used to perform the method for drying waste as discussed above. To avoid repeating reference is made to the description regarding the method.

The floor segments are only movable in the plane. The floor segments are designed such that they can perform a step-wise movement in the direction of movement and the counter direction allowing a push floor movement of waste on top of the floor.

Preferably, the openings are formed such that the air can pass the openings from the pressure chamber to the waste chamber parallel to the plane. This means that the openings are not positioned in the plane itself reducing the risk of small particles in the waste entering the pressure chamber through the openings. Simultaneously, it is possible by such openings to form in use a kind of air cushion beneath the waste allowing an even distribution of the warm air into the waste.

The openings are in particular formed by deforming the material of the floor segment. Preferably, the floor and the floor segments are manufactured from metal such as a steel and the openings are formed by cutting the metal, preferably stripe-wise and deform this stripes, preferably into bulges the plane. This is easily possible as metal is ductile allowing the plane of the floor to remain undeformed. Simultaneously, in this manner well-defined openings can be formed allowing to easily define a pressure drop for air passing the openings from the pressure chamber to the waste chamber.

Preferably, at least one cyclone is connected to air outlets of the waste chamber allowing the off-gas in the waste chamber to pass the cyclone for particle reduction such that an exhaust air from the cyclone contains a smaller particle load than the input gas into the cyclone which is the off-gas from the waste chamber.

Preferably, the dryer further comprises at least two cyclones connected in parallel to the waste chamber by air outlets and at least one exhaust air fan arranged to suck the off-gas in the waste chamber through the cyclones, each air outlet being arranged at a different position in the direction of movement, each air outlet comprising a temperature sensor for measuring the temperature of the air in the air outlet, said temperature sensors being connected to a control device for determining a temperature profile of the off-gas in the waste chamber in the direction of movement and using this temperature profile to control at least one of the following components:

A) a drying air heater for controlling the temperature of the warm air entering the pressure chamber;

B) a circulation fan for controlling at least one of the following variables: the pressure in the pressure chamber and the volume flow of the warm air entering the pressure chamber; and C) a floor movement system for controlling the movement speed of the waste through the waste chamber.

Preferably, at least the floor movement system is controlled based on the temperature profile according to option C) above. The floor movement system is preferably a hydraulic floor movement system having at least two hydraulic cylinders for separately moving single floor segments individually or groups of floor segments individually. The circulation fan and the exhaust air fan are preferably fans with adjustable rotating speed.

Preferably, the dryer further comprises an air preheater comprising a heat exchanger for heat transfer between the off-gas of the waste chamber or exhaust air from at least one cyclone with fresh air to be provided to the pressure chamber.

Preferably, the dryer further comprises a wet scrubbing unit for cleaning the off-gas of the waste chamber or exhaust air from at least one cyclone and for transferring thermal energy from the off-gas of the waste chamber or exhaust air from at least one cyclone to the warm air. Preferably, the transfer of thermal energy can be performed using a heat pump.

Figure 2:
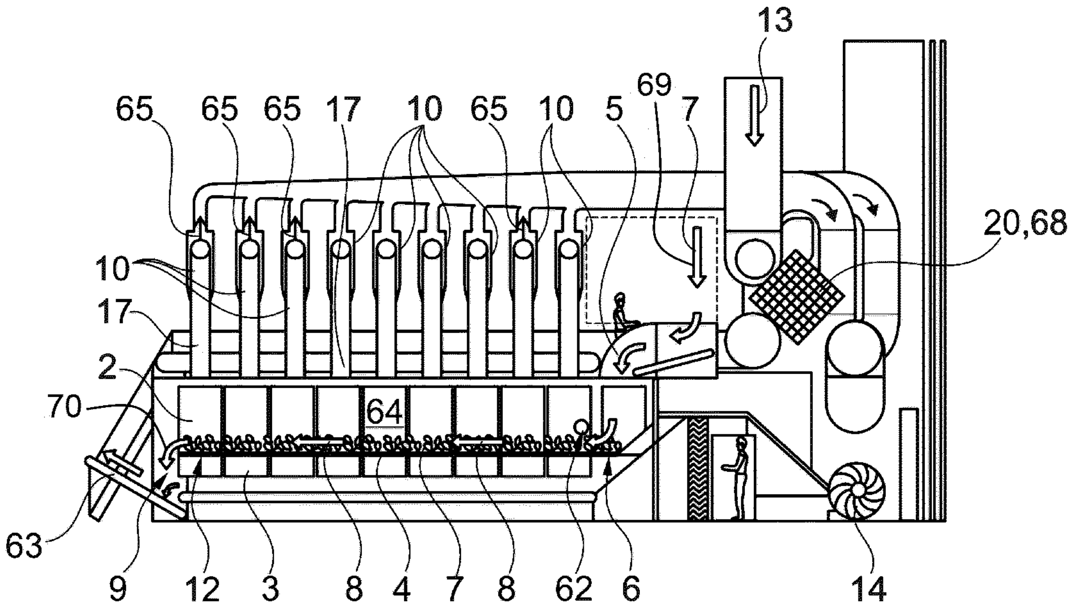
Figure 3:
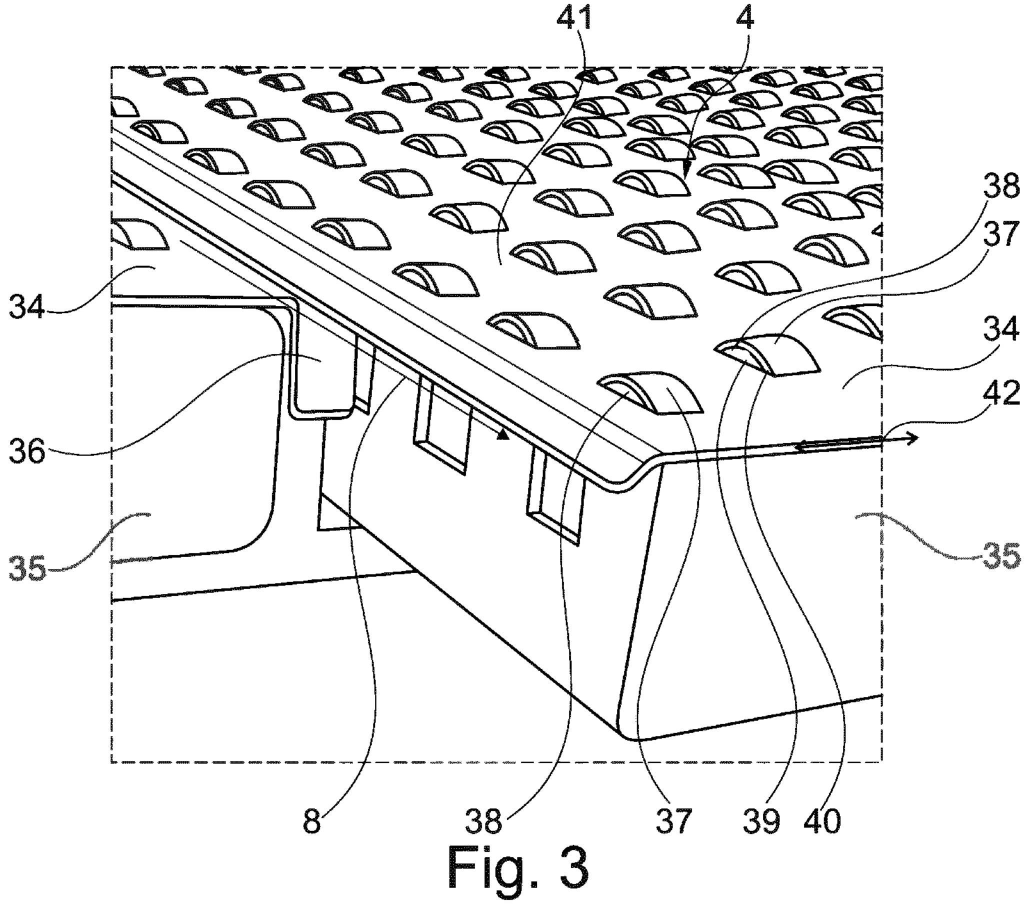
Figure 4:
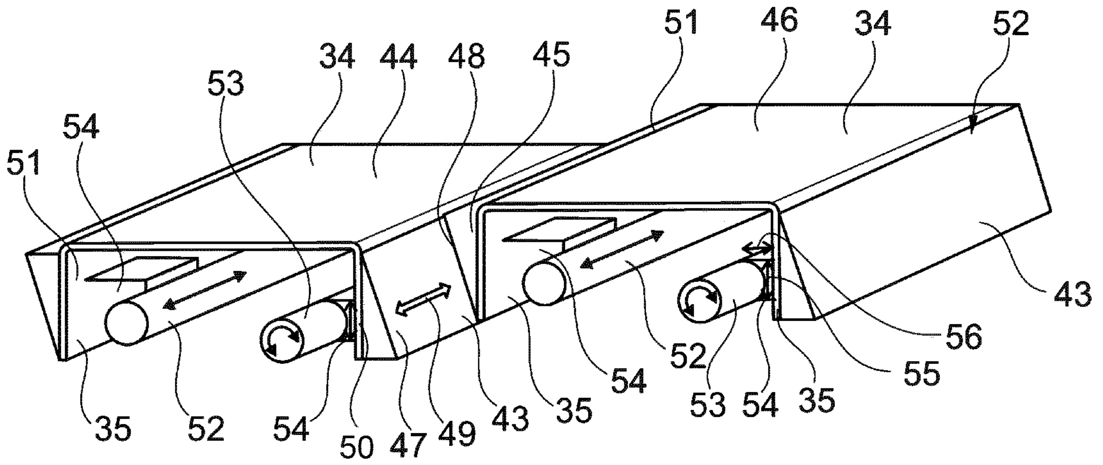
Figure 6:
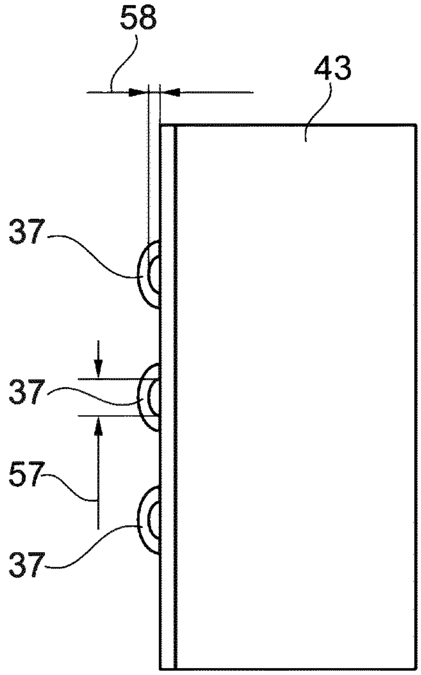
Figure 5:
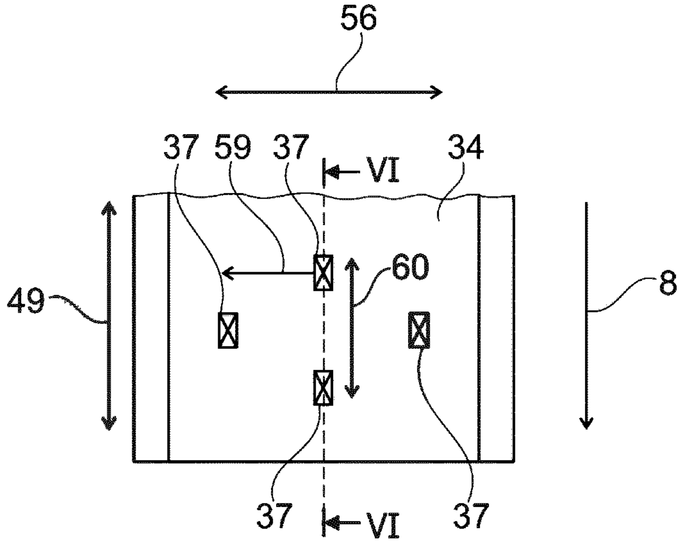

It should be noted that the individual features specified in the claims may be combined with one another in any desired technologically reasonable manner and form further embodiments of the invention. The specification, in particular taken together with the figures, explains the invention further and specifies particularly preferred embodiments of the invention. Particularly preferred variants of the invention and the technical field will now be explained in more detail with reference to the enclosed figures. It should be noted that the exemplary embodiment shown in the figures is not intended to restrict the invention. The figures are schematic and may not be to scale. The figures display:

FIG. 1 a schematic view of an example of a dryer for drying waste;

FIG. 2 a longitudinal section of the example of a dryer;

FIG. 3 a detail showing details of two floor segments of the example of a dryer;

FIG. 4 details of two parallel floor segments of a second example of a dryer;

FIG. 5 a top view of a part of a floor segment of the second example of a dryer;

FIG. 6 a section of a floor section of the second example of a dryer; and

Figure 7:
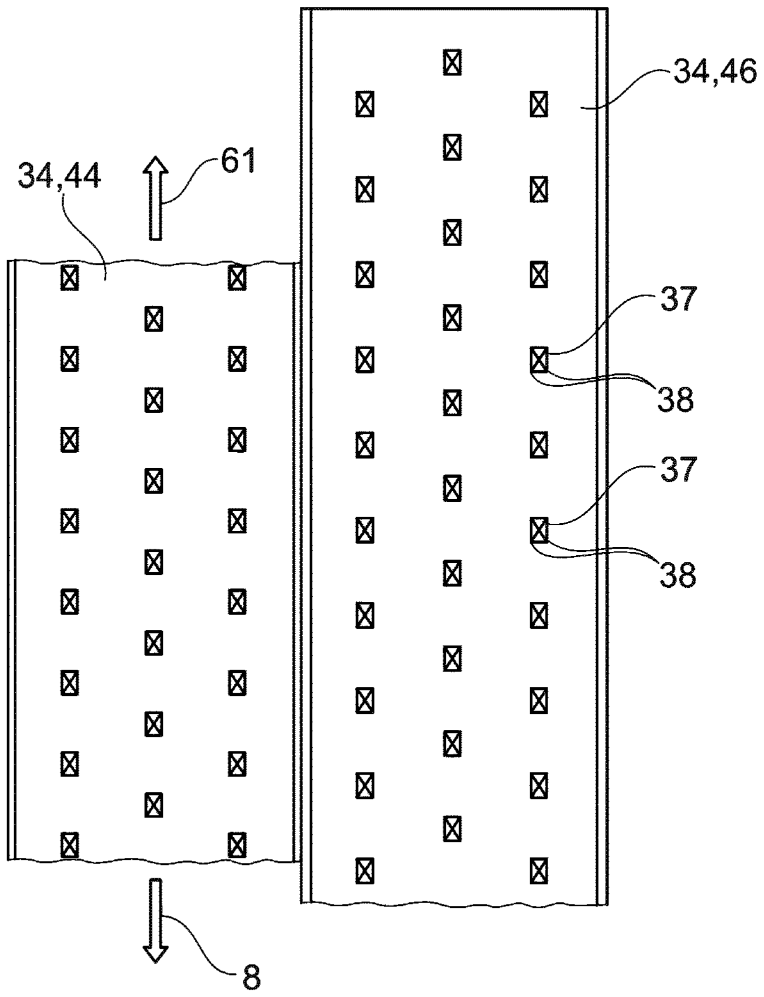

FIG. 7 a top view of two floor sections of the second example of a dryer.

FIG. 1 shows an example of a dryer 1 for drying waste in a schematic view, FIG. 2 is a longitudinal section of this dryer 1. Both figures are discussed in the following in common (for sake of clarity only reference numerals are provided with in FIG. 1 and/or in FIG. 2). The waste comprises preferably municipal dry waste, industrial waste and/or biomass. The waste can be shredded and/or milled before being delivered into the dryer 1. In general, the waste is having a particle size distribution which is inhomogeneous and the composition of the waste is inhomogeneous as well. In particular, the waste comprises organic and/or inorganic compounds.

The dryer 1 comprises a waste chamber 2 and a pressure chamber 3 which are separated by a floor 4. The setup of the floor 4 will be described in more detail with respect to FIGS. 3 to 7. The dryer 1 has an inlet 5 defining an inlet end 6 of the floor 4. Through the inlet 5 waste 7 is applied onto the floor 4 as wet waste 69 and, thus, into the waste chamber 2. The waste 7 is moved through the waste chamber 2 in a direction of movement 8 from the inlet 5 to an outlet 9 of the waste chamber 2. The outlet 9 defines an outlet end 12 of the floor 4. A leveler 62 at the inlet 5 limits the height of the waste 7 on the floor 4. The leveler 62 is preferably a roll that presses the waste 7 to a defined height. At the outlet end 12 a dry waste feeder 63 is situated for conveying the waste 7 falling from the floor 4 at the outlet end 12 as dry waste 70 onwards, e.g. to a furnace for burning the dry waste 70 or the like. The dry waste feeder 63 is preferably a screw conveyor.

While moving the waste 7 through the waste chamber 2 the waste 7 is dried by providing warm air 11 having a temperature of about 80° C. to the pressure chamber 3 and driving the air through openings in the floor 4 into the waste chamber 2 and through the waste 7. The air is guided after having passed the waste 7 as an off-gas 64 through one of several cyclones 10 for particle or dust separation. The warm air 11 is provided by guiding fresh air 13 by use of a circulation fan 14 through a drying air heater 15.

After having passed the waste 7 the air enters the air room above the waste 7 in the waste chamber 2 as off-gas 64. The off-gas 64 is humid or moist and can contain particles from the waste 7 and/or chemical compounds carried along from the waste 7. By use of an exhaust air fan 16 the off-gas 64 is sucked from the waste chamber 2 through the cyclones 10. A plurality of cyclones 10 is arranged along the length of the waste chamber 2. Off-gas 64 from the waste chamber 2 is entering the cyclones 10 through air outlets 17 (only partially provided with reference numerals in FIG. 2 for reasons for sake of clarity). The length is limited by the inlet end 6 on the one end and by the outlet end 12 on the other end. Each air outlet 17 has a specific position in direction of movement 8, and, obviously, off-gas 64 from around the position of the air outlet 17 is passing through the respective outlet 17. The temperature of the off-gas 64 in the air outlets 17 is measured individually by temperature sensors 18. Thus, it is possible to define a temperature profile of the air in the waste chamber 2 in the direction of movement 8. The temperature sensors 18 are connected to a control device 66.

In the cyclones 10 particles are separated from the off-gas 64. Thus, an exhaust air 65 (only in part provided with reference numerals for the sake of clarity) is having a smaller particle load than the off-gas 64. The exhaust air 65 is collected in the exhaust air line 21.

At the inlet 5 the waste 7 that is deposited on the inlet end 6 of the floor 4 is wet waste 69, i.e. having a higher humidity of e.g. up to 40%, while the waste 7 that is leaving the floor 4 at the outlet end 12 is dry waste 70, i.e. having a lower humidity of e.g. 5% and less. Thermodynamically, the evaporation of water needs the enthalpy of evaporation to be introduced. Close to the inlet end 6 the humidity is high, therefore, the energy consumption necessary to evaporate the humidity is high. This leads to a large drop of the temperature of the air between the warm air 11 and the air in the air outlet 17 in this region of the dryer 1. Close to the outlet end 12 the waste 7 is already dryer, thus, less energy is necessary leading to a smaller temperature drop of the air between the warm air 11 and the air entering the respective air outlet 17. This temperature profile allows to control the dryer 1 in particular regarding the movement speed of the waste 7 through the waste chamber 2.

The movement of the waste 7 through the waste chamber 2 is the result of a walking floor principle implemented in the floor 4 as will be discussed in detail below. The floor 4 comprises several floor segments, which can be individually moved by a floor movement system 67, in this example a hydraulic floor movement system 19 which is controlled based on the temperature profile as mentioned above by the control device 66.

To increase the efficiency of the air heating an air preheater 20 with a heat exchanger 68 is positioned in the exhaust air line 21 in which the exhaust air 65 from the cyclones 10 is collected and sucked of by the exhaust air fan 16. The exhaust air fan 16 is controlled as well by the control device 66 being connected to the exhaust air fan 16. In the air preheater 20 the relatively warm exhaust air 65 is in heat exchange with the fresh air 13 to preheat the fresh air 13 before entering the drying air heater 15. Alternatively or additionally, via a recirculation line 22 at least a part of the exhaust air 65 can be guided from the exhaust air line 21 to the drying air heater 15. Therefore, a circulation of the drying air is possible. The flow through the recirculation line 22 can be controlled by a recirculation control valve 23 disposed in the recirculation line 22 being controlled by the control device 66.

The exhaust air is provided downstream of the exhaust air fan 16 to a wet scrubbing unit 24. In the wet scrubbing unit 24 possible contaminants in the exhaust air are scrubbed so that clean air 25 is taken from an upper dome 26 of the wet scrubbing unit 24. Simultaneously, the thermal energy content of the exhaust air is transferred in part to the washing solution, preferably water, being circulated by a scrubber pump 27 from a sump 28 of the wet scrubbing unit 24 through a scrubbing circulation line 29. While passing the circulation line 29 the washing solution passes a heat exchanger 30 being part of a heat pump 31. Here, an intermediary heat medium such as water is heated in the heat exchanger 30 by heat transfer from the washing solution and is then transferred via a pump 32 to the drying air heater 15 to heat the drying air provided as warm air 11 to the pressure chamber 3. Between the heat exchanger 30 and the drying air heater 15 the heat medium passes a heater coil 33 allowing in particular an easy start-up of the system and might provide further thermal energy to the heat medium if the situation in the drying air heater 15. Likewise, the heat medium downstream of the drying air heater 15 is passing the heater coil 33. It is possible to heat the intermediary heat medium by the heat pump 31 to the temperature of the warm air 11 when entering the pressure chamber 3 or above allowing to heat the warm air 11 accordingly. For example, the exhaust gas 65 when entering the wet scrubbing unit 24 is at a temperature of about 30° C. to 35° C. and the washing solution enters the wet scrubbing unit 24 with a temperature of 12° C. to 16° C. Due to i.a. the condensation enthalpy of the humidity in the exhaust air 65 which is transferred to the washing solution the temperature of the washing solution when leaving the wet scrubbing device 24 is about 25° C. to 30° C. which is used as a heat source in the heat pump 31.

By controlling the circulation fan 14 and the exhaust air fan 16 by the control device 66 preferably a situation is generated in which the pressure in the waste chamber 2 is identical to the ambient pressure around the dryer 1 while the pressure within the pressure chamber 3 is slightly above ambient forcing air from the pressure chamber 3 through the openings into the waste chamber 2.

The movement of the waste 7 through waste chamber 2 and the configuration of the floor 4 will be discussed in the following with respect to FIGS. 3 to 7. The floor 4 comprises several floor segments 34. Generally, it is sufficient to provide two floor segments 34. Nevertheless, in particular considering the weight of the floor segments 34 more than two floor segments 34 are preferred as by this the individual floor segment 34 is easier to move by the floor movement system 67 during the process of drying waste compared to a larger (preferably wider) floor segment 34. The floor segment 34 is usually build from materials that can carry the load of the waste 7 which is applied in use on top of the floor segment 34 and which can withstand the temperature of the warm air 11 conveyed into the pressure chamber 3. Preferably, the floor segments 34 are made from steel, in particular from stainless steel. As can be seen in particular in FIG. 3 each floor segment 34 is provided on a carrier 35, preferably made from steel, in particular from carbon steel. The carrier 35 and, consequently, the respective floor segment 34 can be moved in the direction of movement 8 and in the opposite direction 61. This is performed by the hydraulic floor movement system 19 as described above. In case of a floor segment 34 wearing off it can easily be separated from the respective carrier 35 and can be replaced. Preferably, each floor segment 34 spans the whole length of the waste chamber 2 as this facilitates the control of the movement of the floor segments 34 and, consequently, the waste 7 through the waste chamber 2.

As can be seen from FIG. 3 a seal 36 is provided between adjacent floor segments 34 to ensure that no air or only a small amount of air is leaking in between adjacent floor segments 34. Each seal 36 is fixed in this embodiment to one floor segment 34 and is moving with this floor segment 34. The seals 36 are preferably made from a thermoplastic material, in particular from polytetrafluorethylene (PTFE).

Each floor segment 34 comprises a plurality of bulges 37 only some of which are provided with a reference numeral in FIG. 3 for the sake of clarity. Each bulge 37 constitutes two openings 38. Each bulge 37 is manufactured by cutting two parallel lines in the direction of movement 8 into the floor segment 34 forming a strip and then shaping the strip into the final bulge 37 while elongating the strip. Thus, each opening 38 is delimited by a respective first edge 39 of a plane 41 of the floor segment 34 and a respective second edge 40 of the respective bulge 37.

The floor 4 defines a plane 41 which is spanned by the direction of movement 8 and a cross direction 42 of the floor 4. Therefore, the bulges 37 protrude from this plane 41. The openings 38 are formed in such a manner that air provide to the pressure chamber 3 is passing through the openings 38 parallel to the plane 41. The openings 38 are in this example oriented perpendicular to the plane 41. By the warm air 11 passing through the openings 38 a kind of an air cushion can be formed underneath the waste 7 on top of the floor 4 facilitating a homogeneous distribution of the warm air 11 over the entire waste 7. To further improve this a large number of openings 38 is preferred, in particular being spaced apart between 50 to 70 mm in the direction of movement 8 (measured between the centers of adjacent bulges 37) and about 45 to 65 mm in cross direction 42 (measured between the centers of adjacent bulges 37). Preferably, the bulges 37 are arranged in lines in the direction of movement 8, with adjacent lines being offset in direction of movement 8, preferably by half the distance between adjacent bulges 37 in the direction of movement 8. Preferably, the number of openings 38 and the area of the openings 38 is such that the total floor permeability is in the range of 7% to 7.5% resulting in a floor pressure drop being in the range of 70% to 80% of the total pressure drop of the floor 4 and the waste 7 on top of the floor 4. Preferably, the openings 38 are evenly distributed on the floor 4. The floor segments 34 can only move in the plane 41. It is not possible for the floor segments 34 e.g. to be raised out of the plane 41 by the floor movement system 67.

A second example of a dryer 1 having a different floor 4 is now described with respect to FIGS. 4 to 6. Here, only the differences of the second example shall be discussed while reference is made to the first example of the floor 4 described above for the sake of conciseness. In the second example the sealing mechanism between two adjacent floor segments 34 is different compared to the first example. Instead of a single seal 36 between two adjacent floor segments 34 as in the first example the sealing mechanism between two adjacent floor segments 34 relies on a first seal 43 attached two a first floor segment 44 and a second seal 45 attached to an adjacent second floor segment 46. The first seal 43 and the second seal 45 cooperatively generate the necessary sealing between the adjacent floor segments 44, 46. Both seals 43, 45 have a triangular cross section having a first oblique side 47 in the case of the first seal 43 and a second oblique side 48 in case of the second seal 45 which correspond to each other. This ensures the sealing effect while facilitating the relative movement between the adjacent floors segments 44, 46 in the direction of movement 8 and in the counter direction 61 as symbolized by the arrow 49 as the oblique sides 47, 48 act as gliding means as well.

Each carrier 35 of floor segment 34, 44, 46 has on a first side 50 (e.g. the "left" side seen in direction of movement 8) a first seal 43 and on an opposite second side 51 (e.g. the "right" side seen in direction of movement 8) a second seal 45. This allows an easy assembly of the floor 4 from respective floor segments 34. As in the first example the seals 43, 45 are preferably manufactured from a thermoplastic material, in particular PTFE.

Furthermore, FIG. 4 shows an example of how to move the floor segments 34, 44, 46. Each carrier 35 is mounted on a first rod 52 and a second rod 53 by mounting structures 54 attached to the inside of the carrier 34. By moving the first rod 52 and the second rod 53 in direction of the arrow 49 a movement of the respective floor segment 34 in direction of movement 8 and in the counter direction 61 can be generated. By rotating the rods 52, 53 an adjustment of the respective floor section 34 in a height direction 55 and a side direction 56 can be realized due to the crescent structure of the mounting structures 54 to create a floor 4 spanning the plane 41.

For the sake of clarity, the bulges 37 and the respective openings 38 are not depicted in FIG. 4. FIG. 5, disclosing a top view of one single floor segment 34 according to the second example, and FIG. 6, disclosing a section according to the line “VI-VI” in FIG. 5 disclose specifics of the bulges 37 and the openings 38. The bulges 37 are formed semi-circular from a strip of steel as described above. Each opening 38 has in this example a maximum diameter 57 in the direction of movement 8 and a maximum height 58 in the height direction 55. Preferably, to create a reasonable pressure drop for the warm air 11 flowing through the opening 38 is formed such that a ratio of the maximum height 58 to the maximum diameter 57 is in between 0.12 and 0.18.

Bulges 37 adjacent in the side direction 55 are placed having a side distance 59 between each other. Bulges 37 adjacent in the length direction 55 are placed having a length distance 60. Preferably, the bulges 37 are placed such on the floor segment 34 that a ratio of the side distance 59 to the length distance 60 being in the range of 0.75 to 0.9.

FIG. 7 depicts a top view on a first floor segment 44 and a second floor segment 46 according to the second example. Both the first floor segment 44 and the second floor segment 46 comprise a plurality of bulges 37 with respective openings 38 arranged in rows in the direction of movement 8. Each floor segment 44, 46 can be moved to a certain extend in the direction of movement 8 and in the counter direction 61. At least two, preferably more, floor segments 34, 44, 46 form the floor 4. It is preferred that groups of floor segments 34, 44, 46 are moved simultaneously, for example every other floor segment 34 being moved simultaneously (as an example a first, third, fifth and seventh floor segment 34 are moved simultaneously forming a first group, while the intermittent second, fourth, sixth and eight floor segments 34 are moved simultaneously independently from the first group forming a second group).

If a floor segment 34 moves in the direction of movement 8 the waste 7 being situated on this floor segment 34 is moved with the floor segment 34 as well in the direction of movement 8. Usually, the movement is a step like movement. I.e., the respective floor segment 34 is moved for a pre-determined amount (e.g. 10 cm [centimeters] or the like) in the direction of movement 8 creating a vacancy close to the inlet end 6 of the floor segment 34. Later on, the same floor segment 34 is moved for the same amount into the counter direction 61. Nevertheless, waste 7 has in the meantime been delivered through the inlet 5 onto the floor 2 so that the vacancy created is now filled and the leveler 62 (see FIG. 2) prevents a pile up of the waste 7. Therefore, the waste 7 at the outlet end 12 of the floor segment 34 drops from the floor segment 34, preferably into a dry waste feeder 63, e.g. a screw or belt conveyor.

According to the present invention waste 7 is dried by applying the waste 7 to a floor 4 comprising several floor segments 34, 44, 46 and by conveying the waste 7 by a push floor mechanism in which only a part of the floor segments 34, 44, 46 is moved at a time in a direction of movement 8 or a counter direction 61. The energy for drying the waste 7 is provided by warm air 11 through openings 38 in the floor segments 34, 44, 46 from a pressure chamber 3 through the floor 4 into the waste 7 and through the waste 7.

REFERENCE NUMERALS

1 dryer
2 waste chamber
3 pressure chamber
4 floor
5 inlet
6 inlet end
7 waste
8 direction of movement
9 outlet
10 cyclone
11 warm air
12 outlet end
13 fresh air
14 circulation fan
15 drying air heater
16 exhaust air fan
17 air outlet
18 temperature sensor
19 hydraulic floor movement system
20 Air preheater
21 exhaust air line
22 recirculation line
23 recirculation control valve
24 wet scrubbing unit
25 clean air
26 upper dome
27 scrubber pump
28 sump
29 scrubbing circulation line
30 heat exchanger
31 heat pump
32 pump
33 heater coil
34 floor segment
35 carrier
36 seal
37 bulge
38 opening
39 first edge
40 second edge
41 plane
42 cross direction
43 first seal
44 first floor segment
45 second seal
46 second floor segment
47 first oblique side
48 second oblique side
49 arrow
50 first side
51 second side
52 first rod
53 second rod
54 mounting structure
55 height direction
56 length direction
57 maximum diameter
58 maximum height
59 side distance
60 length distance
61 counter direction
62 leveler
63 dry waste feeder
64 off-gas
65 exhaust air
66 control device
67 floor movement system
68 heat exchanger
69 wet waste
70 dried waste

The invention claimed is:

1. A method for drying waste (7), comprising steps of:

applying waste (7) into a waste chamber (2) on an inlet end (6) of a floor (4) which comprises at least two floor segments (34, 44, 46);

providing warm air (11) of a temperature of more than 70° C. to a pressure chamber (3) beneath the floor (4), with a pressure being above the pressure in the waste chamber (2), so that the warm air (11) is passing through openings (38) in the floor (4) into the waste chamber (2) and through the waste (7);

conveying the waste (7) in a direction of movement (8) from the inlet end (6) to an outlet end (12) of the floor (4) by moving individual floor segments (34, 44, 46) into the direction of movement (8) and in a counter direction (61) being opposite the direction of movement (8) for a predetermined amount, respectively; and conveying waste (7) having fallen from the outlet end (12) of the floor (4) out of the waste chamber (2);

wherein:

the floor defines a plane (41) in which the floor (4) extends, and the at least two floor segments (34, 44, 46) of the floor (4) are arranged at the same height such that a respective top surface of each of the at least two floor segments (34, 44, 46) forms a respective part of the plane (41);

the at least two floor segments (34, 44, 46) stay in the plane (41) when conveying the waste (7) in the direction of movement (8) from the inlet end (6) to the outlet end (12) of the floor (4) by moving individual floor segments (34, 44, 46) into the direction of movement (8) and in the counter direction (61) being opposite the direction of movement (8) for the predetermined amount, respectively.

2. The method according to claim 1, wherein the floor (4) causes a first drop in a pressure of the warm air passing the openings (38), wherein the waste (7) on the floor (4) causes a second drop in the pressure of the warm air passing from the openings (38) through the waste (7), wherein the amount of waste (7) being applied to the floor (4) is controlled such that a ratio between the first drop and the second drop is at least 2.

3. The method according to claim 1, wherein off-gas (64) is sucked off from the waste chamber (2) above the waste (7).

4. The method according to claim 3, wherein the off-gas (64) is provided to at least one cyclone (10) to separate particles in the off-gas (64) from an exhaust air (65).

5. The method according to claim 4, wherein the off-gas (64) is sucked through at least two cyclones (10) connected in parallel to the waste chamber (2), each cyclone (10) being arranged at a different position in the direction of movement (8), whereas a temperature of the off-gas (64) flowing to each cyclone (10) is measured allowing to determine a temperature profile of the off-gas (64) in the direction of movement (8) and using this temperature profile to control at least one of following variables:

a) the temperature of the warm air (11) entering the pressure chamber (3);

b) a volume flow of the warm air (11) entering the pressure chamber (3); and c) a movement speed of the waste (7) through the waste chamber (2).

6. The method according to claim 4, wherein the off-gas (64) or the exhaust air (65) is conveyed to a wet scrubbing unit (24).

7. The method according to claim 4, wherein the off-gas (64) or the exhaust air (65) is guided through a heat exchanger (68) for preheating fresh air (13) to be delivered to the pressure chamber (3) as warm air (11).

8. The method according to claim 4, wherein the warm air (11) is heated before entering the pressure chamber (3) by heat provided from a heat pump (31) in which latent heat of the off-gas (64) or the exhaust air (65) is used as a source of thermal energy.

9. The method according to claim 1, wherein a level of the waste (7) applied onto the floor (4) is controlled to be at a predetermined level.

10. A dryer (1) for drying waste (7), comprising a waste chamber (2) and a pressure chamber (3), said waste chamber (2) being separated from the pressure chamber (3) by a floor (4) for carrying the waste (7), wherein said floor (4) defines a plane (41) in which the floor (4) extends, an inlet (5) for applying waste (7) onto an inlet end (6) of the floor (4) and an outlet (9) for removing waste (7) from on outlet end (12) of the floor (4) defining a direction of movement (8) in the plane (41) from the inlet end (6) to the outlet end (12), wherein the floor (4) comprises at least two floor segments (34, 44, 46), each floor segment (34, 44, 46) being movable independent of at least one other floor segment (34, 44, 46) in the plane (41) in the direction of movement (8) and against the direction of movement (8), wherein the floor segments (34, 44, 46) comprise openings (38) connecting the pressure chamber (3) with the waste chamber (2), wherein the pressure chamber (3) is providable with warm air at a pressure being higher than the pressure in the waste chamber (2);

wherein the at least two floor segments (34, 44, 46) are arranged at the same height such that a respective top surface of each of the at least two floor segments (34, 44, 46) forms a respective part of the plane (41).

11. The dryer (1) according to claim 10, wherein the openings (38) are formed such that the warm air can pass the openings (38) from the pressure chamber (3) to the waste chamber (2) parallel to the plane (41).

12. The dryer (1) according to claim 10, wherein the openings (38) are formed by bulges (37) protruding from the plane (41).

13. The dryer (1) according to claim 10, further comprising at least two cyclones (10) connected in parallel to the waste chamber (2) by air outlets (17) and at least one exhaust air fan (16) arranged to suck the in the waste chamber (2) through the cyclones (10), each air outlet (17) being arranged at a different position in the direction of movement (8), each air outlet (17) comprising a temperature sensor (18) for measuring the temperature of the off-gas (64) in the air outlet (17), said temperature sensors (18) being connected to a control device (66) for determining a temperature profile of the off-gas (64) in the waste chamber (2) in the direction of movement (8) and using this temperature profile to control at least one of following components:

A) a drying air heater (15) for controlling the temperature of the warm air entering the pressure chamber (3);

B) a circulation fan (14) for controlling at least one of following variables: the pressure in the pressure chamber (3) and the volume flow of the warm air (11) entering the pressure chamber (3); and C) a floor movement system (67) for controlling a movement speed of the waste (7) through the waste chamber (2).

14. The dryer (1) according to claim 10, further comprising an air preheater (20) comprising a heat exchanger for heat transfer between the off-gas of the waste chamber or exhaust air from at least one cyclone with fresh air to be provided to the pressure chamber.

15. The dryer (1) according to claim 10, further comprising a wet scrubbing unit (24) for cleaning the off-gas (64) of the waste chamber (2) or exhaust air (65) from at least one cyclone (10) and for transferring thermal energy from the off-gas (64) of the waste chamber (2) or exhaust air (65) from at least one cyclone (10) to the warm air (11).

* * * * *